July 14, 1942.  M. A. WEST  2,289,561

SCREW

Filed Nov. 8, 1940  2 Sheets-Sheet 1

INVENTOR
Maxwell A. West

BY T. J. Geisler and
L. R. Geisler
ATTORNEYS

July 14, 1942.   M. A. WEST   2,289,561
SCREW
Filed Nov. 8, 1940   2 Sheets-Sheet 2

INVENTOR
MAXWELL A. WEST
BY T. J. Geisler and
F. R. Geisler.
ATTORNEYS

Patented July 14, 1942

2,289,561

UNITED STATES PATENT OFFICE 2,289,561

SCREW

Maxwell A. West, Portland, Oreg., assignor, by direct and mesne assignments, to Champion, Inc., Portland, Oreg., a corporation of Oregon Application November 8, 1940, Serial No. 364,897

4 Claims. (Cl. 85—45)

This invention relates to screws and screw manufacture and, in particular, to double-slotted screws or screws having a recess of cruciform shape.

More specifically, this invention relates to screws in which the slot or slots extend entirely across the head of the screw, as, for example, in screws made of specially-hardened material in which it is not feasible to form a recess in the head by the usual punching operation, but in which the recess must be cut or milled.

Many types of recessed-head screws have been invented within the past few years, but one common objection to the specially-shaped recesses in these is that the recesses can be made only with the use of a punch. Another objection to the special recesses is that they are suited for being driven only with a screw driver having a specially-shaped bit and a bit of an exact size to conform to the size of the recess.

One of the objects of this invention is to provide a screw with a slotted recess which can be formed either by cutting or milling or by punching or striking.

Another object of this invention is to provide a screw with a slotted head in which the slots extend entirely across the head but in which the recess will nevertheless be specially-adapted for a screw driver having the bit described in the co-pending application, Ser. No. 358,900 filed under date of September 28, 1940, and entitled Driver tool.

A further and particular object of this invention is to provide a screw with a slotted recess of cruciform shape, which may be milled or punched, and which is so formed as to permit the screw to fit snugly on the bit of a special driver tool such as that described in United States Letters Patent No. 2,218,631, issued October 22, 1940, and entitled Screw driver.

These as well as incidental objects I am able to attain by having a pair of intersecting slots arranged at right angles to each other, intersecting on the screw axis, and extending entirely across the screw head, and providing a conically-shaped cavity on the screw axis extending below the bottom of the slots, and by otherwise forming the slotted recess in the head of the screw as hereinafter to be described.

In the following description reference is to be made to the accompanying drawings in which.

Figure 1:
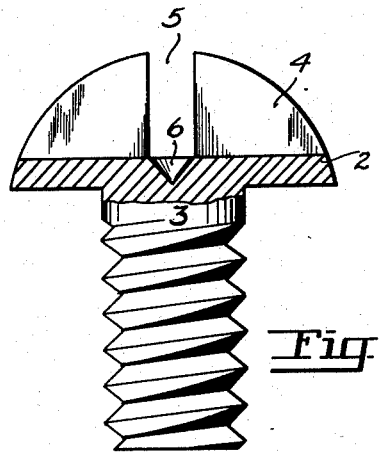
Figure 1 is a vertical section taken through a round-headed screw having a cruciform slot formed in accordance with my invention, the section being taken through the center of the screw head and thus on the line designated I—I of Figure 2.
Figure 2:
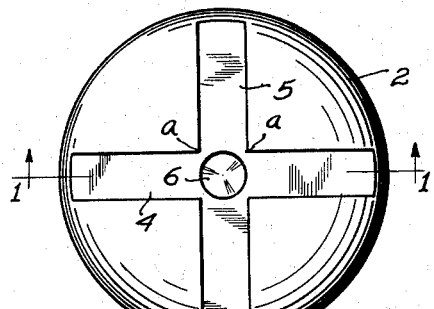
Figure 2 is a plan view of the slotted head of Figure 1.

Referring first to Figures 1 and 2, in the rounded head 2 of the screw 3 a pair of intersecting slots 4 and 5 are cut, which slots intersect each other at right angles on the screw axis. Both of these intersecting slots are identical, both being cut to the same depth and both extending diametrically the entire distance across the screw head. The side walls of the slots are parallel respectively throughout their entire extent. The bottoms of the slots form flat surfaces all of which lie in the same plane except for a center cavity 6. This center cavity 6 is in the form of an inverted cone with the apex located on the screw axis, and the diameter of the top of the cavity is approximately equal to the width of the slots, as apparent in Figure 2.

In forming the recess of this screw the two slots 4 and 5 are first cut to the desired depth and finally the conical cavity 6 is milled by a suitable milling tool. Due to the fact that this cavity does not reach the side walls of the slot, there is no danger of marring the side walls or of interfering with the corner intersections $a$ of the side walls when this central cavity is milled. This permits the side walls to afford maximum bearing surfaces for the wings or faces of any suitable screw driver and is one of the important features of my invention.

Figure 3:
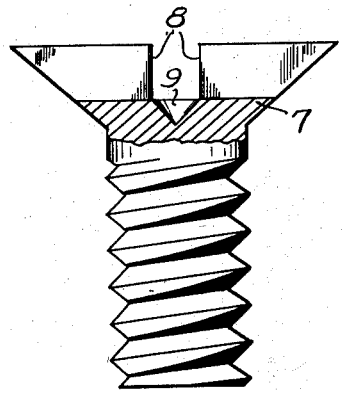
Figure 3 is a sectional view, similar to Figure 1, but showing a flat-headed screw instead of a round-headed screw, the screw slot however being formed the same as in the screw of Figure 1.

The recess in the flat head 7 of the screw shown in Figure 3 is formed in exactly the same manner as that of the screw in Figures 1 and 2. The side walls 8 of the slots are parallel respectively and the side walls are perpendicular to the plane of the slot bottoms. The width of the slots is exactly the same as in the screw of Figures 1 and 2 and the conical cavity 9 is of the same size as the cavity 6.

Figures 7, 8, 9:
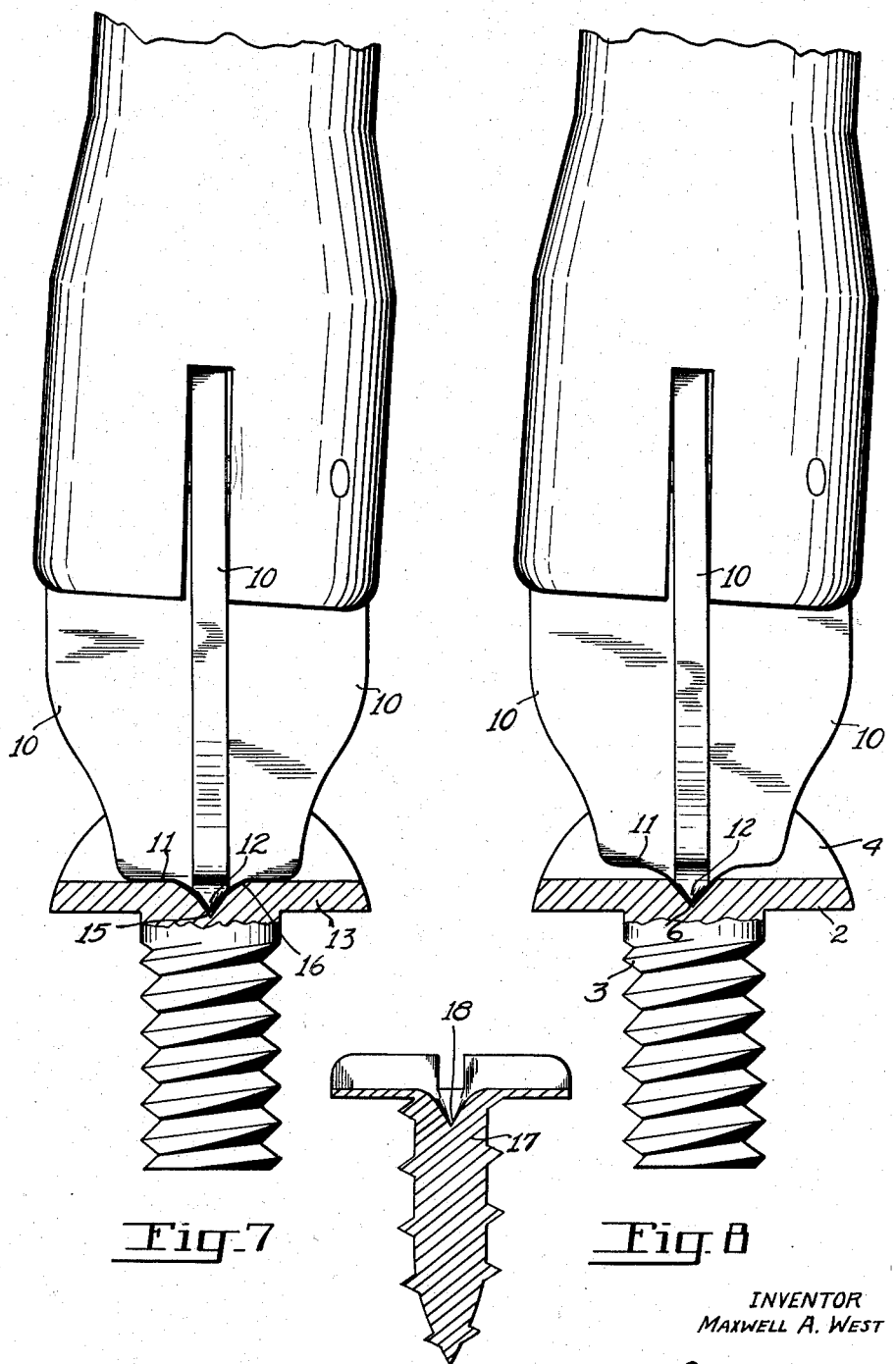
Figure 7 is a sectional view identical to Figure 4 but showing a specially-formed screw driver inserted in the recess.
Figure 8 is a sectional view identical to Figure 1 but showing the same specially-formed screw driver inserted in the recess of the screw of Figure 1.
Figure 9 is a longitudinal section, taken on the axis, of a common flat-top sheet metal screw having a recess corresponding to that of Figures 4 and 5, this screw however being drawn to a slightly smaller scale.

Either of the screws mentioned might be driven with an ordinary screw driver, but a screw driver having a bit of cruciform cross-section, as for example, a bit formed from a milled bar of metal of cruciform shape, would be more efficient since this would present a greater extent of driving surface against the slot walls. Screw drivers of various widths could be used also, provided the thickness of the blade or wings remained the same, although obviously the width of the blade or wings should be sufficient to provide for the engaging of a substantial portion of the side wall areas. However, I consider a screw driver having the specially-formed bit described in the co-pending application, Ser. No. 358,900 above mentioned as the most satisfactory for use with this improved screw and this recess has in fact been particularly designed for the purpose of being suitable for such a screw driver. In Figure 8 a driver having such a bit is shown in position in the recess of the head 2 of the screw in Figures 1 and 2.

Referring to Figure 8 the screw driver bit illustrated, which is of cruciform cross-section, comprises four identical wings 10 of uniform thickness, the ends of the wings being concaved as indicated at 11 and the ends of the wings converging to a point 12 at the tip. The lateral edges of the wings are rounded to prevent possible marring of the tops of the walls of the screw recess if the driver is rotated while the bit is being inserted in the recess. The pointed tip 12 and the curved and rounded surfaces at the ends of the wings greatly facilitate the centering of the bit properly in the recess. The cavity 6 in the screw recess accommodates the pointed tip 12 of the bit. Were it not for this central cavity 6 the bit could not be inserted into the screw recess so far, and consequently the ends of the wings 10 of the bit would present considerably smaller bearing surfaces to the recess walls, and in flat-headed screws, such as that shown in Figure 3, this bit would have very limited engagement with the walls of the recess and as a result there would be danger of the reaming of the recess and of the slipping of the bit out of the recess. In other words, without the central cavity 6 it would not be feasible to use this particular bit in the double-slotted cut recess.

Figure 4:
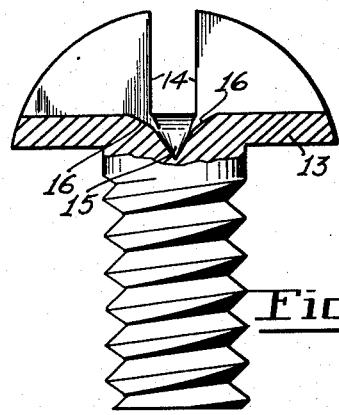
Figure 4 is a sectional view of a round-headed screw, similar to the screw of Figure 1, but illustrating a slightly-modified form of my recess adapted to be made by a punch.
Figure 5:
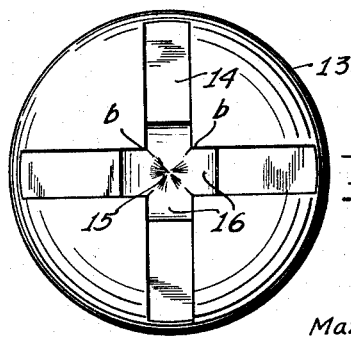
Figure 5 is a plan view of the screw head of Figure 4.

In Figures 4 and 5 I show a round-headed screw 13, similar to the screw of Figures 1 and 2, in which the slotted recess 14 has a central conical cavity 15, the lower portion of which is similar to the cavity 6 but which is extended somewhat further or deeper into the screw. The bottoms of the slots curve downwardly as at 16 adjacent the central cavity, thus leading to the cavity 15. This screw recess and central cavity are adapted to be formed through a striking and punching operation instead of by cutting or milling. When so formed it is possible to make the deeper conical recess and the downwardly-curved adjacent sections of the slot bottoms without reducing the side wall areas and without any cutting away of the corners b (Figure 5) produced by the intersecting side walls.

In all other respects this recess is the same as the cut or milled recess in the screws of Figures 1, 2 and 3. The sheet metal screw 17 of Figure 9 has its recess struck and punched out in this manner with the deeper central cavity 18 and the bottoms of the slots curved downwardly at points adjacent the center cavity.

As was mentioned previously with reference to the screws of Figures 1, 2 and 3, the screw shown in Figures 4 and 5, as well as the screw of Figure 9 may be driven by an ordinary screw driver or by any special driver having a bit of cruciform cross-section, but the recess in these screws has been designed more particularly to accommodate the special driver bit of the co-pending application Ser. No. 358,900. Figure 7 illustrates this same special driver bit in position in the recess of the screw 13 of Figures 4 and 5. Due to the deeper central cavity 15 and to the downward sloping adjacent sections 16 of the slot bottoms, the driving wings 10 of the bit will be seated even further in this screw recess than in the recess of the screw illustrated in Figure 8. However with either screw this special driver tool will be very efficiently employed.

With my invention it is possible to provide a screw having a flat or "binding" head, of the type illustrated in Fig. 9, with double slots and a center cavity of satisfactory depth, adapted to accommodate the tip of a self-aligning bit, without unduly weakening the head or shank of the screw. In a screw of this type, with the "binding" head as illustrated, it would not be feasible or even possible to have a recess of the form found in other special recessed screws at present on the market corresponding to specially-formed drivers required for these other screws. Not only can my slotted recess be made in a screw such as the screw 17 of Figure 9, but, when the special driver and bit, such as illustrated in Figure 7, are used with this screw, it is possible to have the bit fit so snugly in the screw slots and recess that the screw will be held on the driver until the screw is set in place for driving. With other types of screw recesses it is not possible to gain this same advantage without weakening the screw, unless the head of the screw is made much thicker.

Figure 6:
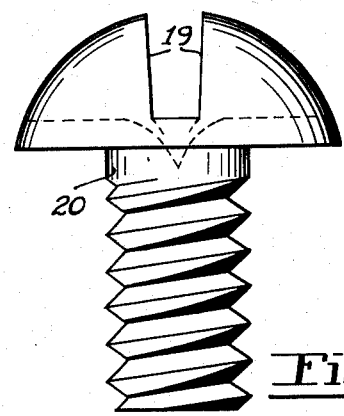
Figure 6 is an elevation of a round-headed screw, but showing the slot walls of the recess slightly tapered instead of being absolutely vertical and parallel.

In the two forms of my screw recess which I have described the side walls of the slots are mentioned as being parallel respectively and also perpendicular to the plane of the slot bottoms. But in either of these two forms the side walls may, if desired, be tapered slightly as illustrated by the side walls 19 of the screw 20 in Figure 6. In such case the intersections of the side walls with the slot bottoms will be parallel respectively throughout their entire extent, just as in the two forms of my recess previously described, and the intersections of these side walls with the top surface of the screw head will likewise be parallel respectively.

Other slight modifications might also be made without departing from the principle of my invention. However, in order to attain my objects satisfactorily I consider it essential to have the bottoms of the slots formed substantially as described, with the side walls intersecting the slot bottoms in parallel lines and with a central cavity extending below the slot bottoms, for the purpose mentioned.

I claim:

1. In a screw head a recess including a plurality of intersecting slots extending diametrically the entire distance across the screw head, said slots intersecting on the screw axis, said slots being identically formed, the bottoms of said slots constituting flat surfaces throughout their major portion and located all in the same plane, the pairs of side walls of said slots forming parallel lines of intersection with the slot bottoms, and a cavity located on the screw axis extending below said bottoms of said slots, said cavity lying entirely within the walled space formed in the intersection of said slots.

2. In a screw head a recess including a pair of intersecting slots extending diametrically the entire distance across the screw head, said slots intersecting on the screw axis, said slots being identically formed, the bottoms of said slots constituting flat surfaces and located all in the same plane, the pairs of side walls of said slots forming parallel lines of intersection with the slot bottoms, said side walls constituting flat surfaces throughout their extent, and a cavity extending below said bottoms of said slots and terminating in a point on the screw axis, said cavity lying entirely within the walled space formed in the intersection of said slots.

3. A screw having a head formed with a driver recess comprising a pair of intersecting slots extending diametrically the entire distance across the screw head, said slots intersecting on the screw axis, said slots being identically formed, the bottoms of said slots constituting flat surfaces and located all in the same plane, the pairs of side walls of said slots forming parallel lines of intersection with the slot bottoms, and a conically-shaped cavity located on the screw axis extending below said bottoms of said slots, said cavity lying entirely within the walled space formed in the intersection of said slots.

4. A screw having a head formed with a recess as described in claim 3, with the side walls of said recess constituting flat surfaces throughout their entire extent and tapering slightly outwardly and upwardly.

MAXWELL A. WEST.